May 20, 1969     G. A. DICKINSON ET AL     3,445,217

COMPOSITE TWEEL WITH INTERNAL SUSPENSION SYSTEM

Filed Oct. 25, 1966

Inventors
George Alfred Dickinson
Charles Fitzroy Griffith
By Morrison, Kennedy & Campbell
Attorneys

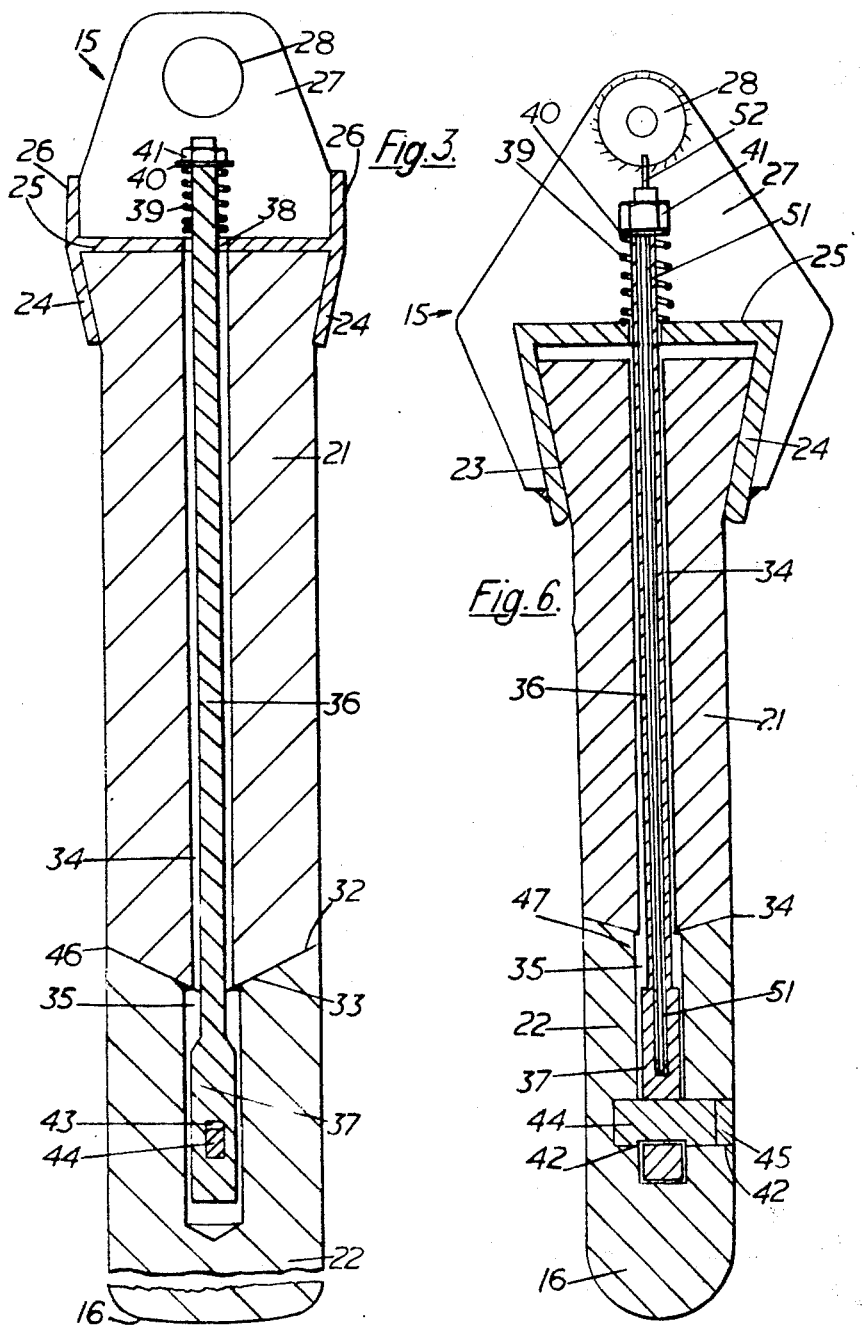

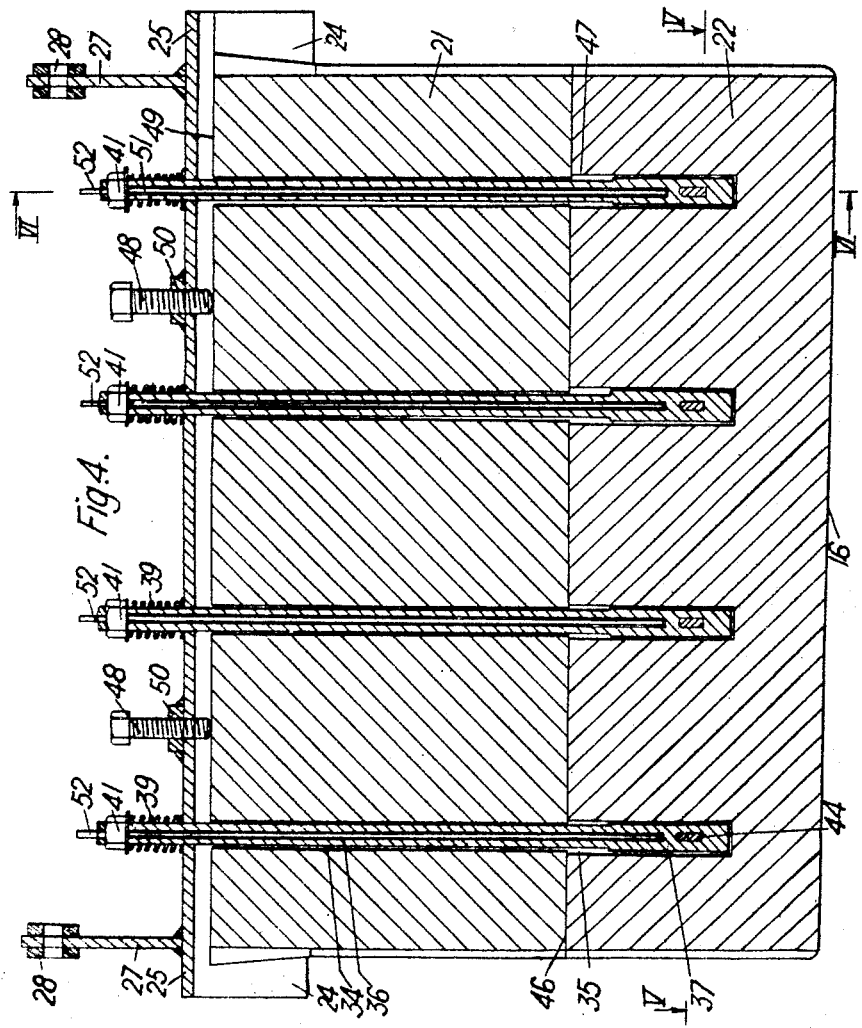

United States Patent Office 3,445,217
Patented May 20, 1969

3,445,217
COMPOSITE TWEEL WITH INTERNAL
SUSPENSION SYSTEM
George Alfred Dickinson, St. Helens, and Charles Fitzroy Griffith, Liverpool, England, assignors to Pilkington Brothers Limited, Liverpool, England, a corporation of Great Britain
Filed Oct. 25, 1966, Ser. No. 589,420
Claims priority, application Great Britain, Nov. 3, 1965, 46,621/65
Int. Cl. C03b 5/30
U.S. Cl. 65—172                                   5 Claims

ABSTRACT OF THE DISCLOSURE

A composite tweel for use in glass manufacturing apparatus comprising an upper part of refractory material resistant to thermal shock and a lower part of refractory material resistant to wear by molten glass, and suspension system including hanger bolts which press the lower portion upwardly against the upper portion.

---

Figure 1:
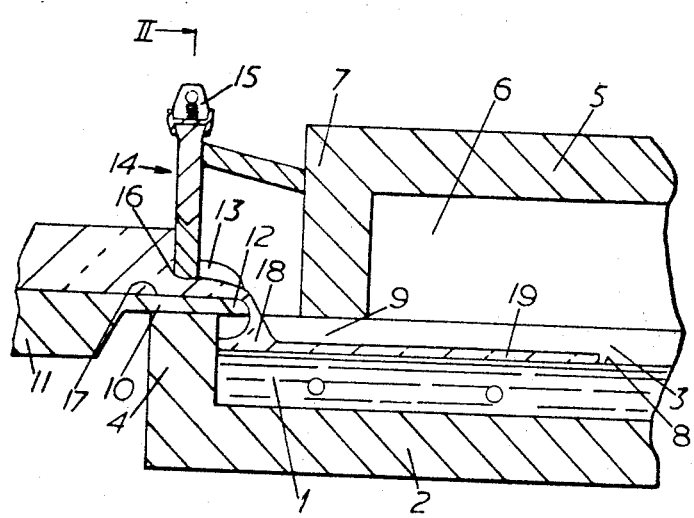

This invention relates to the manufacture of glass, and more especially to improvements in apparatus and methods for the manufacture of flat glass.

In glass manufacturing processes where molten glass is continuously flowing forwardly along a channel it is customary to provide impetus for forward movement of the glass by holding back a head of molten glass by means of a tweel. For example the flow of molten glass along a forehearth of a glass melting furnace is usually controlled by a tweel whose bottom edge is spaced above the floor of the forehearth by a distance such as to allow the desired flow of molten glass along the forehearth to the next stage of the glass manufacturing process. In one glass manufacturing process in which glass in ribbon form is advanced along a bath of molten metal the forehearth terminates in a spout extending over the bath of molten metal and the rate of delivery of molten glass by the spout on to the bath of molten metal is controlled by a tweel adjustably mounted above the spout and defining with the floor of the spout a channel through which a metered flow of molten glass flows for delivery on to the bath.

In other processes the forehearth may conduct molten glass from a glass melting furnace to the pass between a pair of casting rolls and a tweel mounted above the forehearth controls the rate of delivery of molten glass to the pass between the rolls.

Such tweels are usually made of a refractory material which is subject to wear by the constant flow of molten glass against the tweel, and refractory material eroded from the bottom edge of the tweel can contaminate the molten glass.

Fusion cast refractories are resistant to such wear, but are difficult to work with, since a large block of fusion cast refractory does not readily stand up to the rigorous conditions of thermal gradient and thermal shock under which a tweel has to operate, and may even break in the region where the tweel comes out of the glass.

It is a main object of the present invention to provide an improved tweel for use in glass manufacturing processes and apparatus, which overcomes the difficulties in the use of these materials.

A further object of the present invention is to provide an improved tweel for use in a method of manufacturing flat glass in ribbon form during which molten glass is delivered to one end of a bath of molten metal and the flow of molten glass to the bath is controlled by the tweel.

According to the invention there is provided a composite tweel for use in glass manufacturing apparatus, comprising an upper portion of a refractory material which is resistant to thermal shock and which is supported from a tweel iron, and a lower portion of wear resistant refractory material held against the upper portion by hanger bolts extending through both portions from the tweel iron.

In this construction that lower part of the tweel, which is contacted by the molten glass and holds back a head of molten glass, is resistant to erosion by the molten glass flowing under the tweel, as well as being resistant to corrosive attack by the molten glass. Suitable materials for the lower part of the tweel are fusion cast refractory materials, for example fusion cast alumina-zirconia-silica, or fusion cast alumina. Some sintered refractories also have a suitable density as well as the required resistance to corrosion and erosion, for example sintered alumina. The upper part of the tweel which is made of a refractory material has good thermal shock resistance and mechanical strength. This upper tweel part may be made, for example, of a prefired fireclay material or a prefired clay bonded calcined kyanite or sillimanite material, by hand moulding, pneumatic ramming or slip casting.

The wear-resistance of the tweel ensures that contamination of the molten glass passing under the tweel and distortion in the finished glass is minimal. By using a composite tweel according to the invention a reduction in the number of stones in the glass has been noted. Further the tweel does not require such frequent attention and changing as conventional tweels and the improved tweel has been found to eliminate the formation of bubble in the glass when the glass manufacturing process is restarted after a tweel has been changed, thereby reducing the amount of glass that has to be rejected after a tweel change.

In a preferred construction according to the invention the joint between the two portions of the tweel is of V-form and is sealed by a layer of glass introduced into the joint.

It is desirable that molten glass should contact the wear resistant part of the tweel only, and preferably according to the invention the depth of the lower portion of the tweel is greater than the height of the head of molten glass to be held back by the tweel in use.

Further according to the invention passages for the hanger bolts extend right through the upper portion, and co-operating blind passages are formed downwardly into the lower portion, each of said blind passages is intercepted by a transverse hole extending into the lower portion from a face of said lower portion, each hanger bolt is an eye bolt formed with an eye near its lower end which eye is aligned with the appropriate transverse hole when the bolt is in position, and a holding pin is fitted into each said eye through its communicating transverse hole, so that when the tops of the hanger bolts are tightened upwardly relative to the tweel iron, the lower portion of the tweel is pressed into engagement with the upper portion.

Preferably the top of each hanger bolt is threaded and carries an adjustable nut, and a compression spring extends below the nut to a surface of the tweel iron, whereby adjustment of the nuts controls the pressure exerted by the lower portion of the tweel on the upper portion.

For applications where the tweel is to be used at a high temperature it is desirable to provide cooling for the hanger bolts, and in order to effect this cooling a longitudinal bore is formed in each hanger bolt, a pipe of lesser diameter than the bore is inserted in each bore, and the tops of the pipes are arranged for connection to means for supplying a cooling medium to the pipes.

The invention also comprehends glass manufacturing apparatus including a composite tweel constructed as set out above.

One preferred embodiment of the invention is an apparatus for use in the manufacture of flat glass during which glass in ribbon form is advanced along a bath of molten metal, contained in an elongated tank structure, including a spout extending over one end wall of the tank structure for delivering molten glass on to the bath, and a composite tweel as described above supported in adjustable relation with the floor of the spout, the height of the bottom of the tweel above the floor of the spout being adjustable to control the rate of delivery of molten glass to the bath.

The invention also comprehends a method of manufacturing flat glass during which molten glass is delivered to one end of a bath of molten metal at a controlled rate and is advanced along the bath in ribbon form towards the outlet end thereof, characterised by holding back a head of molten glass behind a surface of wear resistant refractory material in order to control the rate of delivery of molten glass to the bath.

Further the invention comprehends flat glass produced by the method set out above and sheets of glass cut therefrom.

Figure 5:
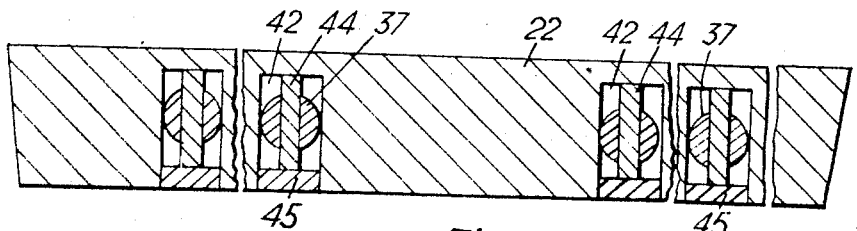
Figure 2:
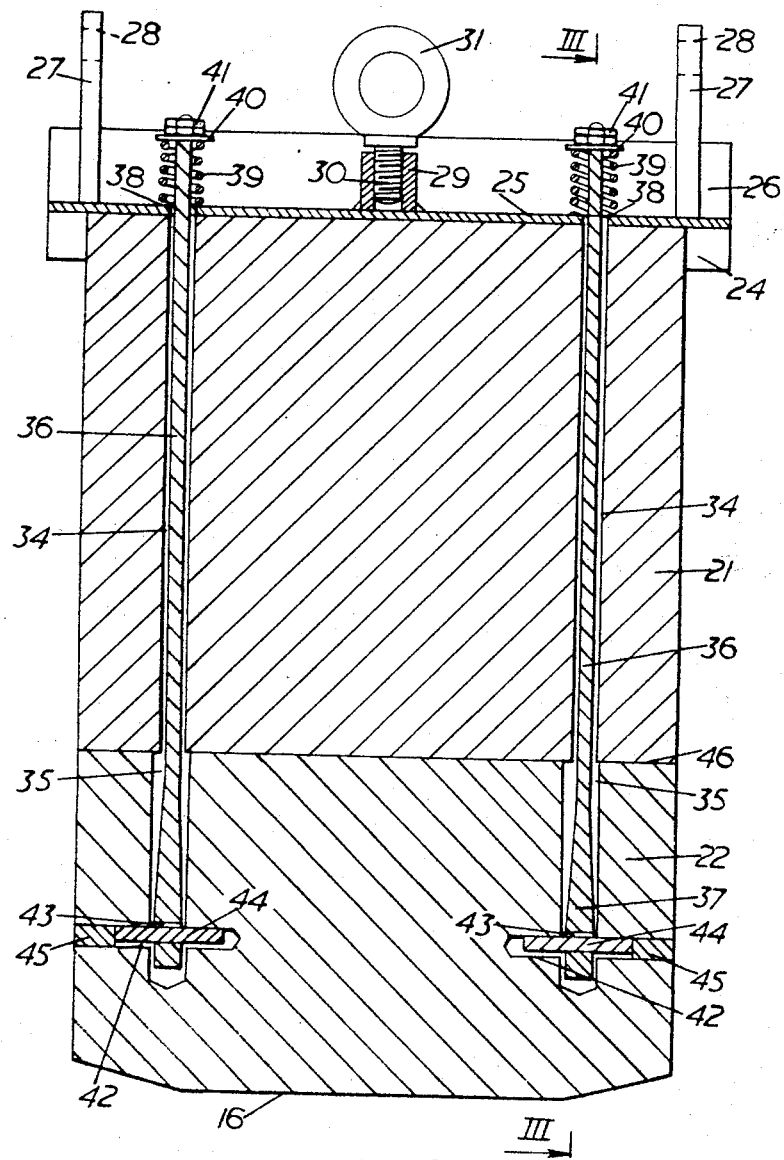

In order that the invention may be more clearly understood some embodiments thereof will now be described, by way of example, with reference to the accompanying drawings in which:

FIG. 1 is a sectional elevation of the inlet end of a tank structure containing a bath of molten metal showing a tweel according to the invention controlling the flow of molten glass down a spout on to the surface of the bath of molten metal, FIG. 2 is a sectional elevation through the tweel of FIG. 1 on the line II—II of FIG. 1, FIG. 3 is a section on line III—III of FIG. 2, FIG. 4 is a view similar to FIG. 2 of another embodiment of the invention, FIG. 5 is a section on line V—V of FIG. 4, and FIG. 6 is a section on line VI—VI of FIG. 4.

In the drawings the same references denote the same or similar parts.

Referring to FIG. 1 of the drawings there is shown the inlet end of a tank structure containing a bath 1 of molten metal for use in the manufacture of flat glass in ribbon form during which the glass in ribbon form is advanced along a bath of molten metal. The tank structure comprises a floor 2, integral side walls 3, and integral end walls 4. A roof structure is mounted over the tank structure to define a headspace over the bath, and the roof structure includes a roof 5, side walls 6, and end walls 7. The end wall 7 at the inlet end of the bath defines with the surface 8 of the bath 1 of molten metal an inlet 9 of restricted height through which glass is advanced along the surface of the bath.

Molten glass is delivered to the bath from a spout 10 which forms an extension of a forehearth 11 of a glass melting furnace. The spout comprises a lip 12 and side jambs 13 which together define a spout of generally rectangular cross-section. A head 13 of molten glass is held back on the forehearth 11 by a composite tweel according to the invention which is indicated generally by the reference 14. The tweel 14 is supported from its top by a tweel iron 15, in known manner, and the height of the bottom edge 16 of the tweel above the upper surface 17 of the spout is adjustable to control the rate of flow of molten glass 18 over the spout lip 12 and on to the bath of molten metal, along whose surface 8 the molten glass is advanced in ribbon form as indicated at 19.

The spout 10 is located in a chamber defined by side walls 20 and a cover 21 extending between the tweel 14 and the inlet end wall 7 of the roof structure.

According to the invention the tweel 14 is a composite tweel and is illustrated in greater detail in FIGS. 2 and 3, and comprises an upper portion 21 of a refractory material which is resistant to thermal shock and has good mechanical strength, for example a prefired fireclay material, or a prefired clay material bonded calcined kyanite or sillimanite material. The tweel also includes a lower portion 22 of a wear resistant refractory material for example a fusion cast zirconia/alumina/ corundum material, or fusion cast alumina or sintered alumina. The top of the upper portion 21 of the tweel has a gradually increasing thickness as indicated at 23 and is held in known manner in the tweel iron 15 which includes downwardly tapering flanges 24 which are engaged around the sloping sides of the top of the tweel portion 21. The flanges 24 depend downwardly from the main body of the tweel iron 15 which is constituted by a cross beam 25, having upstanding side walls 26 to form a top channel section which is closed near its ends by webs 27 which each taper upwardly above the side walls 26 to a support-hole 28 which holes are pierced so that a support rod for the tweel can be threaded through them.

A vertically disposed cylindrical sleeve 29 is welded centrally to the top of the beam 25, and is threaded internally to receive a bolt fixed to a ring 31 which is used for carrying the main weight of the tweel.

The bottom edge 32 of the upper portion 21 of the tweel is V-shaped and fits into a corresponding V-shaped groove 33 in the top edge of the lower portion 22 of the tweel.

Two passages 34 extend down through the upper portion 21 and co-operating blind passages 35 of slightly larger diameter than the passages 34 are formed downwardly into the lower portion 22. Two hanger bolts 36 of heat-resisting alloy are respectively located in the passages 34 and 35, and each bolt has a flattened end 37 of larger width than the diameter of the passage 34 so that each bolt 36 has to be passed upwardly through the appropriate passage 34 before the lower portion 22 of the tweel is fixed to the lower ends of the hanger bolts.

At their upper ends the bolts 36 are threaded and pass through holes 38 in the beam 25. Compression springs 39 are threaded over the projecting upper ends of the bolts 36, and each spring 39 extends between the top surface of the beam 25 and a washer 40 which is held by the spring against a pair of locking nuts 41 threaded onto the top end of the bolt.

Each of the blind passages 35 in the lower portion 22 of the tweel is intercepted by a transverse hole 42, which holes extend into the lower portion from the side edges of the portion 22. The broadened lower end 37 of each of the hanger bolts 36 is formed with an eye 43 which is in alignment with the appropriate transverse hole 42, and when the bolts 36 are in position with the two tweel portions assembled together, a holding pin 44 is fitted into each eye 43 through the hole 42 which is then sealed with a filling 45 of zirconia/alumina/corundum cement.

Thin strips of glass in the form of microscope cover glasses are packed into the V-shaped joint, and the nuts 41 are tightened against the springs 39 to press the lower portion 22 of the tweel against the upper portion.

When the tweel is in position and is being brought up to its normal operating temperature the thin glass strips between the faces 32 and 33 melt and then the hanger bolts 36 are further tightened so that a gas-tight joint is achieved as indicated at 46. Thus leakage of atmosphere through the tweel into the chamber containing the spout 10 is avoided.

The main body of the composite tweel, namely the upper portion 21, is thus constituted by a material which has a high mechanical strength and resistance to thermal shock, e.g. a sillimanite refractory material, whereas that part of the tweel which holds back the head of molten glass, namely the lower portion 22, has good wearing properties and is not readily eroded by the flow of molten glass under the tweel.

Another embodiment of the invention is shown in FIGS. 4 to 6 which illustrate a larger tweel than that of FIGS. 2 and 3. Glass seals the V-shaped joint 46 between the two portions of the tweel and there are four hanger bolts 36 extending down through four equi-spaced passages 34 in the upper portion 21 into cooperating blind passages 35 in the lower portion 22. Fine cement is rammed into the passages 35, just underneath the V-shaped joint 46, as indicated at 47, small depressions being formed in the refractory at the entrances to the blind passages 35 for this purpose.

Transverse holes 42 which intercept the blind passages 35 are formed inwardly into the refractory from one face of the lower tweel portion 22, and, the eye-holes 43 in the hanger bolts 36 being aligned with the holes 42, keys 44 are fitted into the eye-holes in the bolts and the holes 42 in the tweel face are sealed with plugs 45 of refractory cement.

Locating bolts 48, which engage the top surface 49 of the upper portion 21 of the tweel, are threaded through bushings 50 welded to the top surface of the beam 25 to provide means for forcing the tapering faces 23 of the upper portion 21 into contact with the flanges 24, thereby ensuring that the weight of the upper portion 21 is carried by the tweel iron 15.

A small amount of cooling of the hanger bolts may be desirable and this is provided in the embodiment of FIGS. 4 to 6 by forming central blind bores 51 in each of the hanger bolts 36, and inserting in each bore a tube 52 of heat-resisting alloy which is of lesser diameter than the bore, thereby providing a return circulation path for a cooling medium, e.g. air, supplied under pressure through the pipes 52, which are all connected to a supply manifold (not shown). The tops of the hanger bolts may also be connected to an exhaust manifold which removes the heated medium recirculating up the bores 51 in the bolts.

Thus the invention provides an improved tweel construction which is capable of withstanding the severe thermal shock which it receives when it is first lowered into operating position in a glass melting furnace and also the high thermal gradient existing in the tweel but which is not perceptibly corroded or eroded by the molten glass flowing under and against the tweel, so that contamination of the glass, which could otherwise result, is minimised.

We claim:
1. A composite tweel for use in glass manufacturing apparatus, comprising an upper portion of a refractory material which is resistant to thermal shock, a tweel iron from which said upper portion depends, a lower portion of a refractory material which is resistant to wear by molten glass, the upper edge of the lower portion and the lower edge of the upper portion being shaped with matching inter-engaging surfaces, sealing means sandwiched between said inter-engaging surfaces, hanger bolts which extend from the tweel iron through the upper portion and into the lower portion, and holding means co-operating with the hanger bolts and engaging in cavities formed in the lower portion, whereby upward tightening of the hanger bolts relative to the tweel iron presses the lower portion against the upper portion.

2. A tweel according to claim 1, wherein the lower edge of the upper portion is formed as a V-shaped ridge and the upper edge of the lower portion is formed with a mating V-shaped groove into which the ridge fits, and said sealing means consists of a layer of glass between said inter-engaging surfaces.

3. A tweel according to claim 1, wherein passages for the hanger bolts extend right through the upper portion, and co-operating blind passages are formed downwardly into the lower portion, each of said blind passages is intercepted by a transverse hole extending into the lower portion from a face of said lower portion, each hanger bolt is an eye bolt formed with an eye near its lower end which eye is aligned with the appropriate transverse hole when the bolt is in position, and a holding pin is fitted into each said eye through its communicating transverse hole.

4. A Tweel according to claim 3, wherein the top of each hanger bolt is threaded and carries a nut, and a compression spring extends below the nut to a surface of the tweel iron, which spring, through the hanger bolts, presses the lower portion of the tweel against the upper portion.

5. Apparatus for use in the manufacture of flat glass during which glass in ribbon form is advanced along a bath of molten metal, contained in an elongated tank structure, including a spout extending over one end wall of the tank structure for delivering molten glass on to the bath, and a composite tweel according to claim 1 supported in adjustable relation with the floor of the spout so that the height of the bottom of the tweel above the floor of the spout is adjustable to control the rate of delivery of molten glass to the bath.

References Cited

UNITED STATES PATENTS

| 1,321,752 | 11/1919 | Jones | 65—345 |
| 1,322,767 | 11/1919 | De Vaughn | 65—343 X |
| 1,906,695 | 5/1933 | Lufkin | 65—342 X |
| 2,444,731 | 7/1948 | DeVol | 65—25 |
| 2,677,003 | 4/1954 | Arbeit et al. | 65—374 X |
| 2,777,254 | 1/1957 | Siefert et al. | 65—374 X |
| 3,137,559 | 6/1964 | Van Praet | 65—343 |
| 3,342,574 | 9/1967 | Jewell | 65—182 X |
| 3,351,452 | 11/1967 | Robinson | 65—65 X |

DONALL H. SYLVESTER, *Primary Examiner.*

R. V. FISHER, *Assistant Examiner.*

U.S. Cl. X.R.

65—99, 182, 324, 333, 374